United States Patent [19]

Kalina

[11] 4,234,271
[45] Nov. 18, 1980

[54] METHOD AND APPARATUS FOR LOADING AND UNLOADING PIPELINE CAPSULES

[76] Inventor: Alexander I. Kalina, 12439 Millbanks, Houston, Tex. 77031

[21] Appl. No.: 72,318

[22] Filed: Sep. 4, 1979

Related U.S. Application Data

[63] Continuation-in-part of Ser. No. 925,512, Jul. 17, 1979, abandoned.

[51] Int. Cl.³ .............................................. B65G 51/26
[52] U.S. Cl. ......................................... 406/1; 104/88; 406/84; 406/105; 406/110
[58] Field of Search ................... 406/1, 2, 83, 84, 105, 406/110, 111, 117, 155; 104/26 R, 88, 138 R, 155, 156; 213/75 R, 75 A, 75 D

[56] References Cited

U.S. PATENT DOCUMENTS

| | | | |
|---|---|---|---|
| 3,861,316 | 1/1975 | Yamazaki et al. | 104/88 X |
| 3,889,603 | 6/1975 | Harada | 104/26 R |

*Primary Examiner*—Jeffrey V. Nase
*Attorney, Agent, or Firm*—Arnold, White & Durkee

[57] ABSTRACT

A pipeline capsule transportation system and apparatus for transporting a continuous link of capsules, comprising a first elongated pipeline and a second elongated pipeline along which continuous links of capsules are to be transported, a loading station for loading capsules, and an unloading station for unloading capsules, the loading station comprising at least one handling zone, an inclined discharge conduit for displacing capsules from the handling zone to the first pipeline, a capsule coupler for coupling capsules entering the first pipeline to a trailing end of a continuous link of capsules moving along the first pipeline during use, decoupling apparatus for decoupling trains of capsules from a leading end of a continuous link of capsules moving in the second pipeline, a downhill station entrance ramp for diverting decoupled capsules to the handling zone, and a brake for bringing trains of capsules to rest in the handling zone. The unloading station may correspond with the loading station or may comprise unloading means for unloading capsules while passing through the unloading station.

25 Claims, 5 Drawing Figures

METHOD AND APPARATUS FOR LOADING AND UNLOADING PIPELINE CAPSULES

CROSS-REFERENCE TO RELATED APPLICATIONS

This application is a continuation-in-part of applicant's co-pending application Ser. No. 925,512 filed July 17, 1979, now abandoned.

BACKGROUND OF THE INVENTION

The present invention relates to a material moving system in which capsules are transported within a pipeline. More particularly, the present invention relates to a method and apparatus for the loading and for the unloading of capsules and of groups or trains of capsules which comprise part of a continuous link of capsules in a pipeline.

For many years it has been known that fluid could be efficiently transferred by the use of pipelines. A fluid would be introduced into one end of a pipeline, pressure would be applied by means of pumps or gravity and the fluid would flow along the length of the pipeline to a desired destination. Solids may be transported by pipeline if the solids are first ground or crushed and then mixed with a suitable liquid to form a slurry. The slurry may be pumped through a pipeline, although the particles of solid within the slurry introduce additional problems in the apparatus required to pump and transport such material.

Most recently it has been discovered that there may be some energy efficiency in introducing the material to be transported into a capsule and then transporting the capsule through a pipeline. Systems exist whereby packaged or bulk material is introduced into wheeled capsules which are propelled through a pipeline by columns of air. Typically trains of, say, three or four capsules are formed and then transported through the pipeline by columns or "slugs" of air moving through the pipeline.

Two-directional flow is achieved through the use of a closed-loop system. Such a system could, of course, form a circle, or the like, with several terminals. Alternatively, a double pipeline could be built between two primary terminals with one pipeline representing a forward path and the other representing a return path. At each terminal a bypass system may be utilized to prevent the flowing air or fluid from being interrupted at terminals or stations.

As noted above, known capsule systems utilize trains of, say, three or four capsules separated by a column or "slug" of air. However, with prior art arrangements, the total load transported represents only 2% or so of the total pipeline volume. That is, a fully loaded capsule system in such a pipeline includes a volume of material which is only a very small percentage of the total volume of the pipeline.

There has been invented a system which utilizes a continuous train or link of capsules which completely fills the pipeline, which system has been made the subject of a co-pending application Ser. No. 925,514 filed on July 17, 1978, now abandoned.

The present invention relates to a system for loading and unloading capsules included within a substantially completely capsule-filled pipeline.

Prior art capsule systems appear to be limited to capsule speeds in the order of 10 to 12 meters per second. The speed of such capsules may be limited by the frictions between the capsules and the pipeline, the energy requirements for air pumps, and the like, necessary to move the capsules, and by the time required for loading and unloading of the capsules.

Recognizing the need for an improved pipeline capsule transportation system, it is, therefore, an object of the present invention to provide a pipeline capsule transportation system which facilitates the loading and unloading of capsules in a pipeline which contains a substantially continuous link of capsules.

According to one aspect of the invention, a pipeline capsule transportation system comprises: a first pipeline; a substantially continuous first link of capsules in said first pipeline; a second pipeline; a substantially continuous second link of capsules in said second pipeline; a station for unloading said first link of capsules, and for loading said second link of capsules, said station comprising: decoupling means for decoupling from said first link at a decoupling location in said first pipeline a predetermined number of capsules, said predetermined number of capsules defining a train; coupling means for coupling said train together with said second link at a coupling location in said second pipeline; conduit means for providing a path for said train between said decoupling means and said coupling means; valve means for isolating a zone in said conduit means from fluid communication with said first and second pipelines; and brake means for stopping said train in said isolated zone.

The system may include pump means for increasing a pressure in said isolated zone, with said valve means being cooperable with said pump means for creating a zone of relatively high pressure in the isolated zone to accelerate the train toward the coupling means.

The system may include first access means for placing a storage container in fluid communication with an inside of at least one capsule of the train when the train is in the isolated zone, the first access means being operable to empty at least one capsule comprising the train.

The system may further include second access means for placing a supply container in fluid communication with an inside of at least one capsule comprising the train when the train is in the isolated zone, the second access means being operable to fill at least one capsule comprising the train.

The system may conveniently include control means for controlling the decoupling means and the coupling means, to provide an uncoupling rate substantially equal to a coupling rate.

The system may include any conventional type of support means for supporting the length of capsules in the pipeline. In an embodiment of the invention, the support means may comprise magnetic support means of a conventional type for magnetically supporting the links of capsules in the pipelines.

In this embodiment of the invention, the decoupling means may, for example, comprise magnetic field producing means for producing a magnetic field which opposes a magnetic field of said magnetic support means. It will be appreciated, however, that any other form of conventional decoupling means may be employed.

The invention further extends to a method for loading and unloading a pipeline capsule transportation system comprising: conveying a first continuous or contiguous link of capsules in a first length of pipeline; selecting a predetermined number of capsules in the first length of pipeline, said predetermined number of capsules defining a train; uncoupling the train of capsules from the first continuous or contiguous link; accelerating the train of capsules along a first longitudinal pathway of pipeline; diverting the train of capsules into a transverse pathway of pipeline where the capsules may be loaded and unloaded; sealing a first and second end of the transverse pathway when the train of capsules is positioned therein; pressurizing the sealed transverse pathway; communicating the transverse pathway with a second longitudinal pathway; and coupling the train of capsules to a second continuous or contiguous link of capsules in a second length of pipeline.

According to a further aspect of the invention, there is provided a pipeline capsule transportation system for transporting a continuous link of capsules, the system comprising a first elongated pipeline along which a continuous link of capsules is to be transported, a loading station for loading capsules, and an unloading station for unloading capsules, the loading station comprising a handling zone, displacement means for displacing capsules from the handling zone to the first pipeline, and coupling means for coupling capsules entering the first pipeline to a trailing end of a continuous link of capsules moving along the first pipeline in use.

The continuous link of capsules may be transported along the pipeline by an suitable conventional means, but may conveniently be transported along the pipeline by the system which forms the subject of a co-pending patent application Ser. No. 925,514 filed July 17, 1978.

In one embodiment of the invention, the displacement means may comprise a charging conduit for charging capsules into the first pipeline, and acceleration means within the handling zone for accelerating capsules into the first pipeline.

In an example of this embodiment of the invention, the acceleration means may comprise valve means to isolate the handling means from the first pipeline, and pump means to create fluid pressure to accelerate capsules into the first pipeline when the valve means is opened.

In an alternative embodiment of the invention, the displacement means may comprise means for moving capsules from the handling zone to the pipeline, and acceleration means in the pipeline for accelerating such capsules in the pipeline prior to coupling with the continuous link of capsules moving in the pipeline.

Any suitable conventional means may be employed for moving the capsules from the handling zone to the pipeline. Thus, for example, the moving means may be in the form of mechanical moving means, magnetic moving means, gas pressure moving means, or the like.

In an example of this embodiment of the invention, the acceleration means in the pipeline may comprise an enclosure surrounding a length of pipeline and in fluid communication with the length of pipeline, and pump means for pumping a flow of fluid along the enclosure to accelerate capsules passing through the length of pipeline in the enclosure.

In an embodiment of the invention, the unloading station may comprise an unloading zone, decoupling means for decoupling capsules from a continuous link of capsules moving in the first pipeline, diverting means for diverting decoupled capsules to the unloading zone, and brake means to bring the capsules to rest in the unloading zone.

The diverting means may be of any conventional type, such as, for example, electromagnetic diverting means or displaceable mechanical diverting means.

The brake means may be of any conventional type.

The system may include a second elongated pipeline along which a continuous link of capsules is to be transported to the loading station, and the loading station may include decoupling means for decoupling capsules from a continuous link of capsules moving in the second pipeline, diverting means for diverting decoupled capsules to the handling zone, and brake means to bring the capsules to rest in the handling zone.

In an embodiment of the invention, the first and second pipelines may constitute a continuous loop of pipeline having the loading station at one location in the loop and having the unloading station at another location in the loop.

In this embodiment of the invention, the unloading station may include unloading means for unloading capsules while they are moving through the unloading station.

While various types of dynamic unloading means are known which could be applied to the unloading of capsules in the system of this invention, the unloading means may conveniently comprise inverting means for inverting the capsules while passing through the unloading station, and storage means for storing capsule charges discharged under gravity from inverted capsules in the unloading station.

Alternatively, for example, a reduced pressure zone may be provided in the unloading zone to effect unloading of capsules.

In an alternative embodiment of the invention, the first and second pipelines may constitute forward and return pipelines of the system with the loading station at one end and the unloading station at the other end, and with the unloading station corresponding substantially with the loading station in that it comprises an unloading zone, decoupling means for decoupling capsules from a leading end of a continuous link of capsules moving in the first pipeline, diverting means for diverting decoupled capsules to the unloading zone, brake means to bring capsules to rest in the unloading zone, displacement means for displacing capsules from the loading zone to the second pipeline, and coupling means for coupling capsules entering the second pipeline to a trailing end of a continuous link of capsules moving in the second pipeline.

The loading station may conveniently comprise a plurality of separate handling zones, and the unloading station may similarly comprise a plurality of separate unloading zones, with each of the handling and unloading zones having brake means and displacement means, and with each of the handling and unloading zones having diverting means associated therewith, the diverting means being selectively actuable to divert decoupled capsules into selected zones.

The invention further extends to a method of loading and unloading a pipeline capsule transportation system which includes the steps of: conveying a first continuous link of capsules in a first elongated pipeline; selecting a predetermined number of capsules from a leading end of the first continuous link of capsules, said predetermined number of capsules defining a train; uncoupling the train of capsules from the link; diverting the train into a handling zone of a loading station and bringing the train to rest in the handling zone; loading the capsules in the handling zone; displacing the train of loaded capsules from the handling zone to a second elongated pipeline wherein a second continuous link of capsules is being conveyed; coupling the train to a trailing end of the moving second link of capsules; and unloading the capsules at an unloading station between the first and second pipelines, the unloading station being at a point remote from the loading station.

The first and second pipelines may constitute return and forward pipelines of the system, and the method may include the steps of selecting a predetermined number of capsules from a leading end of the second link of capsules to define a train, uncoupling the train, diverting the train into an unloading zone of the unloading station, bringing the train to rest in the unloading zone, unloading the train, displacing the train into the first pipeline, and coupling the train to a trailing end of the first continuous link of capsules moving in the first pipeline.

In an alternative embodiment, the first and second pipelines may constitute a continuous loop and the first and second links of capsules may constitute a single continuous link of capsules, and the method may include the step of unloading capsules at the unloading station while the capsules are moving through the unloading station.

The dynamic unloading of the capsules may be effected by various means. Thus, in one example, the capsules may be unloaded dynamically by the capsules having openings which are normally directed upwardly, and by inverting the capsules in the unloading zone to discharge capsule contents under gravity, by applying a reduced pressure above the capsules to cause discharge of capsule contents, or the like.

Where the capsules are to be unloaded dynamically by inverting them, the capsules may be inverted by various conventional methods.

Thus, for example, the unloading zone may include biasing wheels arranged to engage with each capsule entering the unloading zone to progressively invert the capsules as they move along the unloading zone and thereafter to progressively restore the capsules to their normal upright condition.

In an alternative example, the inverting means may be provided by each capsule having a radially projecting inverting flange and by the unloading zone having a helical type groove to cooperate with the inverting flange to progressively invert the capsules as they move through the unloading zone, and then to progressively restore the capsules to their normal upright condition as they leave the unloading zone.

Embodiments of the invention are now described by way of example with reference to the accompanying drawings.

In the drawings,

FIG. 5 is a schematic, fragmentary representation of an embodiment of the diverting means of the system of FIG. 3.

Figure 1:
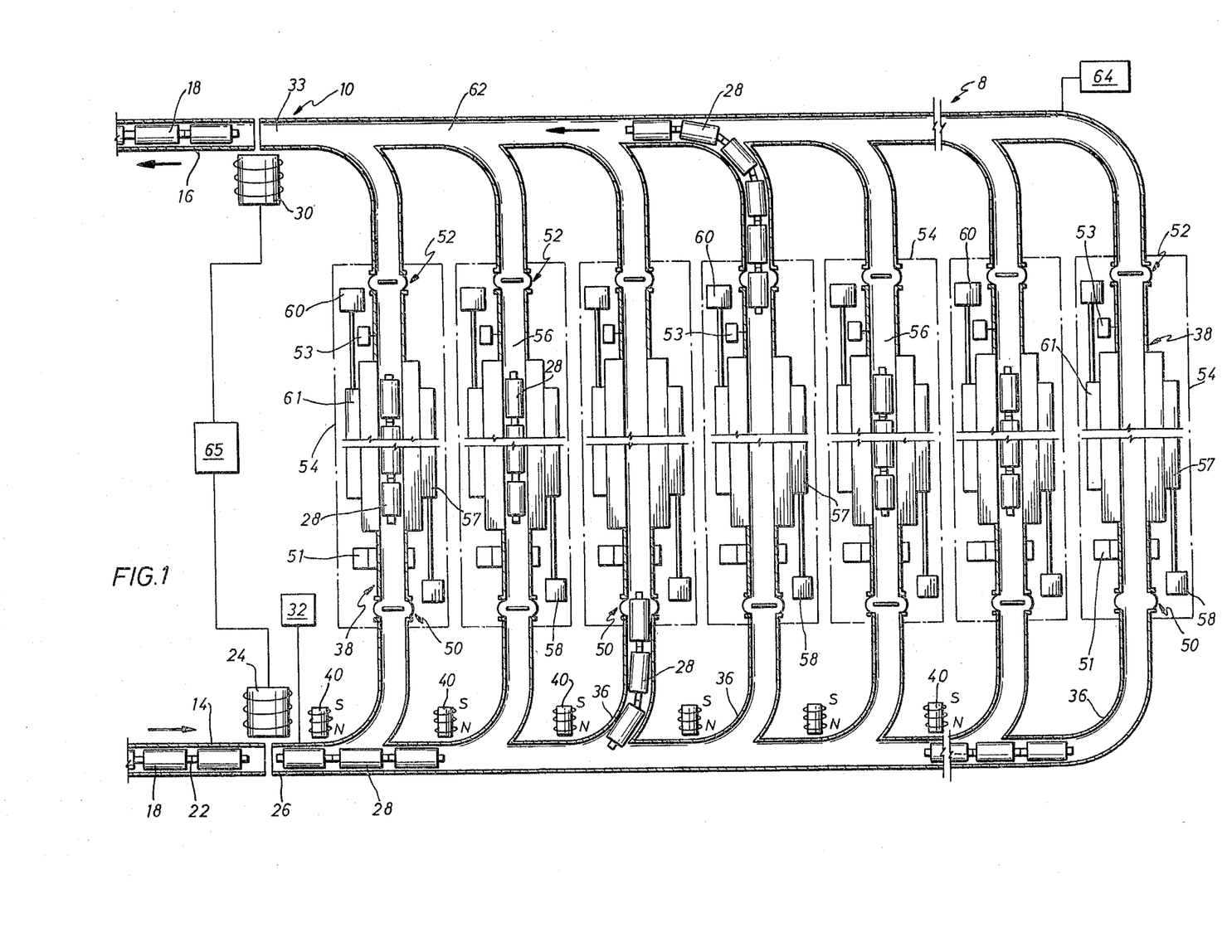
FIG. 1 is a schematic, fragmentary representation of one embodiment of a capsule loading and unloading station in accordance with the invention, FIG. 2 schematically depicts the diverting of a short train of capsules from an endless link in the pipeline.
Figures 2, 5:
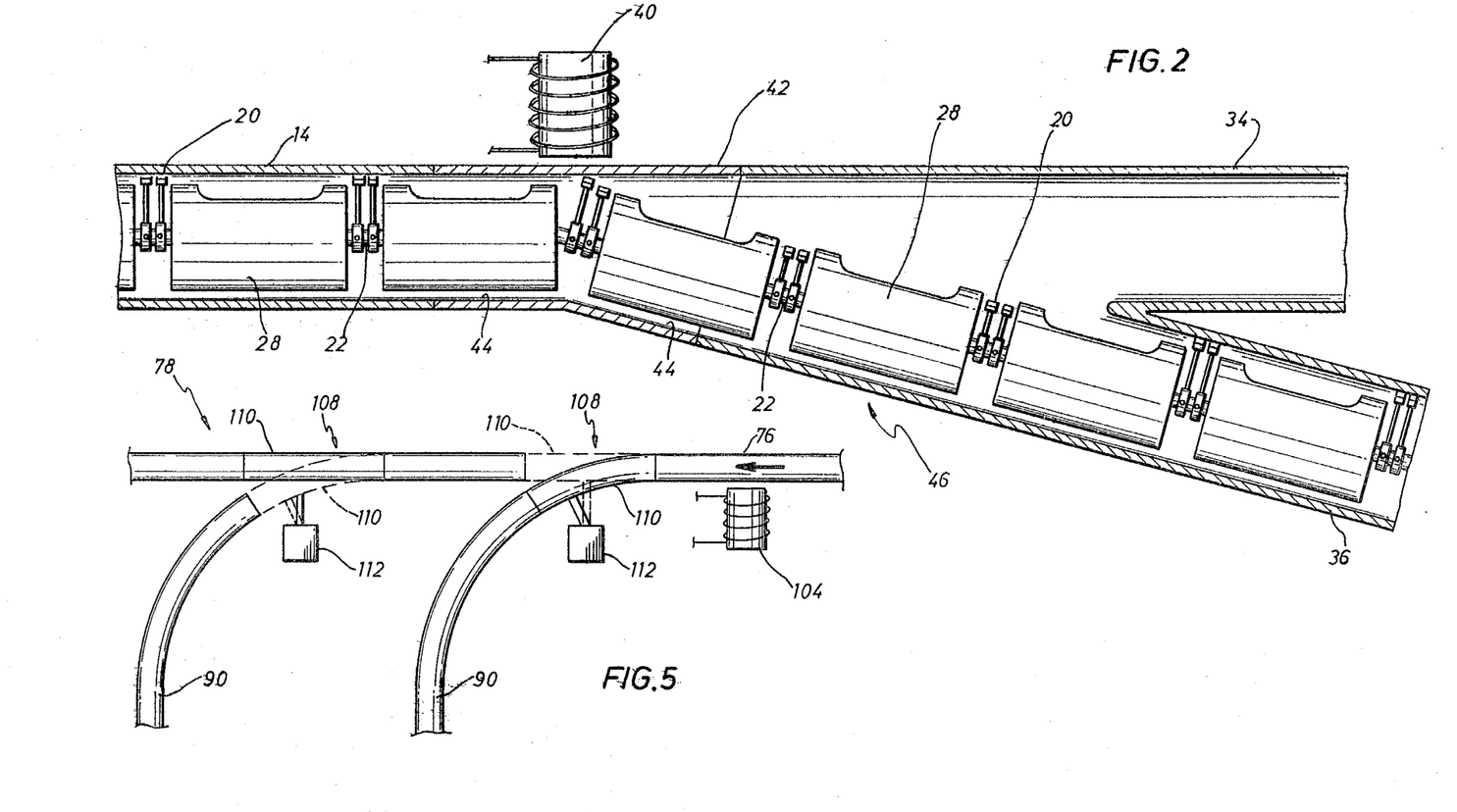

With reference to FIGS. 1 and 2 of the drawings, reference numeral 8 refers generally to a pipeline capsule transportation system including a closed loop of pipeline 10 and a loading and unloading station 12. The closed loop of pipeline 10 may take the form of a generally circular path or may be arranged as a forward pipeline 14 and a return pipeline 16 in a system arranged to transport material between two primary locations. The forward and return pipelines may be of substantially the same length and may extend hundreds or thousands of kilometers.

An endless link of capsules 18 is provided in the forward and return links of pipeline 10. By "endless" it is understood that the forward and return pipelines are completely filled with capsules which form a continuous or contiguous link between loading and unloading stations. If a system is arranged between two primary locations, there may be a loading and unloading station at each of the primary locations with no intermediate loading and unloading stations.

The capsules are preferably supported in the pipeline by a magnetic system 20 the subject of a co-pending application Ser. No. 925,513 filed on July 17, 1978. This magnetic system 20 supports the capsules from above by means of magnetic forces. In addition, there exist in the art capsule couplers 22 for coupling adjacent capsules which couplers are magnetically actuatable. A decoupling apparatus 24 of conventional design is positioned on the forward pipeline 14 at an entrance 26 to the loading and unloading station 12. This uncoupling apparatus is operable to break the endless link of capsules 18 into shorter trains 28 of capsules. A recoupling apparatus 30 of conventional design is positioned on the return pipeline 16 at an exit 33 to the loading and unloading station 12.

The speed of the shorter trains 28 uncoupled from the endless link may, if necessary, be increased by means of an energy transfer apparatus (not shown), the subject of a co-pending application Ser. No. 925,514 filed on July 17, 1978, now abandoned. Alternatively, conventional pumping devices 32 may be utilized to accelerate the short link trains into a station entrance ramp 34. The station entrance ramp 34 may be merely an extension of the existing forward pipeline 14 with a plurality of turns 36 in the pipeline. Each turn defines an entrance to a substation 38 for loading and unloading or for repairs or maintenance.

In a preferred embodiment, the trains of capsules are supported magnetically from above, and as the trains accelerate along the station entrance ramp 34 they pull away from or leave the endless link 18 and are accelerated into proximity with a plurality of electromagnetic devices 40 operable to control the magnetic forces supporting the capsules in the short trains 38.

A portion 42 of the pipeline or guideway adjacent each electromagnetic device 40 is preferably comprised of a non-magnetic or non-ferrous material, such as aluminum or plastic, so that the train 28 of capsules continues to be magnetically supported throughout this portion 42 of pipeline for only the time when the electromagnetic device 40 is actuated to provide a magnetic surface to the magnetic support elements 20 (see FIG. 2). The cancellation of the magnetic forces supplied by the electromagnetic device relieves the capsules of support, thus causing the capsules to fall to the bottom surface 44 of the pipeline. This facilitates the sliding or skidding of the capsules along the bottom of the pipeline, and a downhill station entrance ramp 46 is provided which guides the train into the turn 36 which defines an entrance to a substation. That is, when it is desired to divert a train 28 into a particular substation, the electromagnetic device 40 is deactivated at an appropriate location in the entrance ramp 34 to divert the train 28 onto the downhill ramp 46. This causes the train to drop below the level of the station entrance ramp 34. The downhill ramp, of course, forms a part of each substation 38.

In each substation 38 there is provided a first full diameter valve 50 and a second full diameter valve 52. The first full diameter valve 50 is, of course, open as the train 28 comes into the substation 38. Brake means 51 of conventional design may be used to stop the train as the train enters a work zone 54 of the substation. Preferably, the brake means will act on the last capsule in the train 28 so that the train is maintained in tension.

In addition, the second full diameter valve 52 may be closed and air pressure may be applied by pump means 53 of conventional type to a region 56 between the train 28 and the second valve 52 to function as an air cushion to assist in the deceleration of the train. In any event, once the train has been stopped at a work station 54, the first valve 50 is closed isolating the train from the forward and return pipelines 14 and 16.

In the work areas 54 of each substation, the contents of the capsules in each train may be removed. A wide variety of devices and techniques are known in the art for emptying the trains. For example, the trains may be rotated to facilitate the pouring out of their contents. Alternatively, first access means 57 of any conventional type may be provided for placing a storage container 58 in communication with the interior of the capsules for pumping out materials from the capsules and conveying the materials into the containers 58. Similarly, the capsules may be refilled from overhead supply bins 60 by any conventional second access means 61.

Several substations may be designated for maintenance or repair as opposed to loading and unloading. It will, of course, be appreciated that in the substation the pipeline portion comprising the guideway for the capsules may have windows, aperatures, doors, and the like to facilitate access to the capsules. Capsules may be removed from the entire system or new capsules may be introduced into the system at such locations.

When a task has been completed at the work station 54, that portion of the substation situated between the first and second full diameter valves is isolated from the atmosphere, and pressure is applied into this volume. This pressure must be sufficient such that when the second valve 52 is opened, the capsules are accelerated toward a station exit ramp 62. The station exit ramp 62 uses appropriate energy transfer devices 64 to control the acceleration of each train 28 entering the exit ramp 62 to position such train to be recoupled at 30 at high speed to the return link of capsules 18.

It will be appreciated that a sufficient number of substations exist such that trains may be removed from the endless link comprising the forward pipeline, accelerated away from those capsules in the station entrance ramp 34 and directed into an appropriate substations 38 such that trains 28 which have already been "serviced" in a substation may be re-introduced into the exit ramp 62 to be recoupled to the return link to achieve the same capsule speed in both the forward and the return pipelines. The system may therefore include control means 65 to control coupling and decoupling so that the rates of coupling and decoupling are substantially equal.

For example, for a capsule speed of 30 meters per second in the forward and return pipelines, and a 15-minute total elapsed time in each service station, approximately 90 substations will be required at each loading and unloading station.

It will be appreciated that capsules 18 may be fabricated from any suitable material such as steel, fiberglass, plastic, or the like and that the pipeline comprising the forward and return links may be constructed using conventional and well-known techniques. The pipeline may be above ground or subterranean although it is believed that some ecological benefit may be achieved by utilizing a subterranean arrangement. The decoupling and recoupling mechanisms suitable in the practice of this invention are well known.

Figure 3:
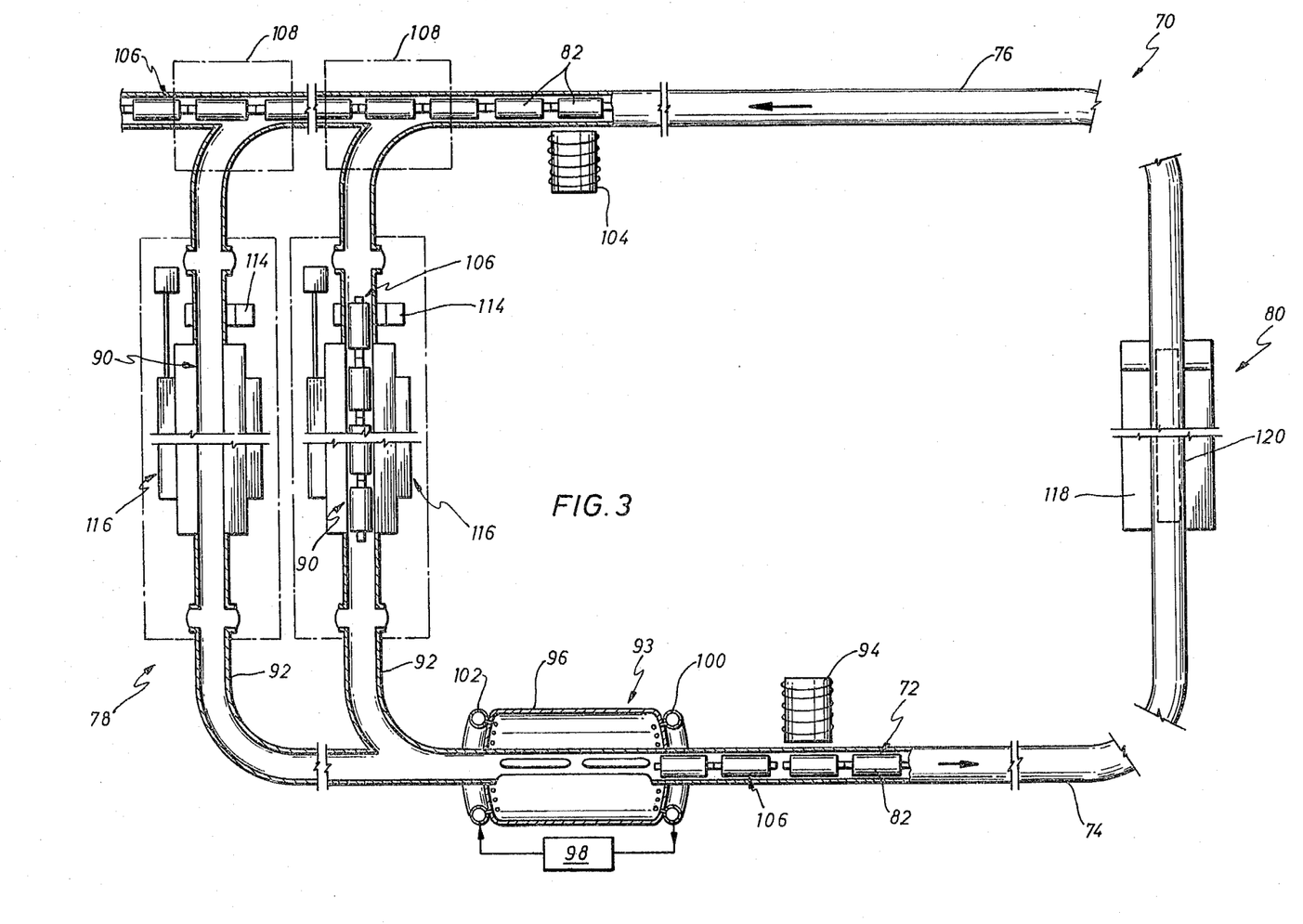
FIG. 3 is a schematic, fragmentary representation of a pipeline capsule transportation system in accordance with an alternative embodiment of the invention.
Figure 4:
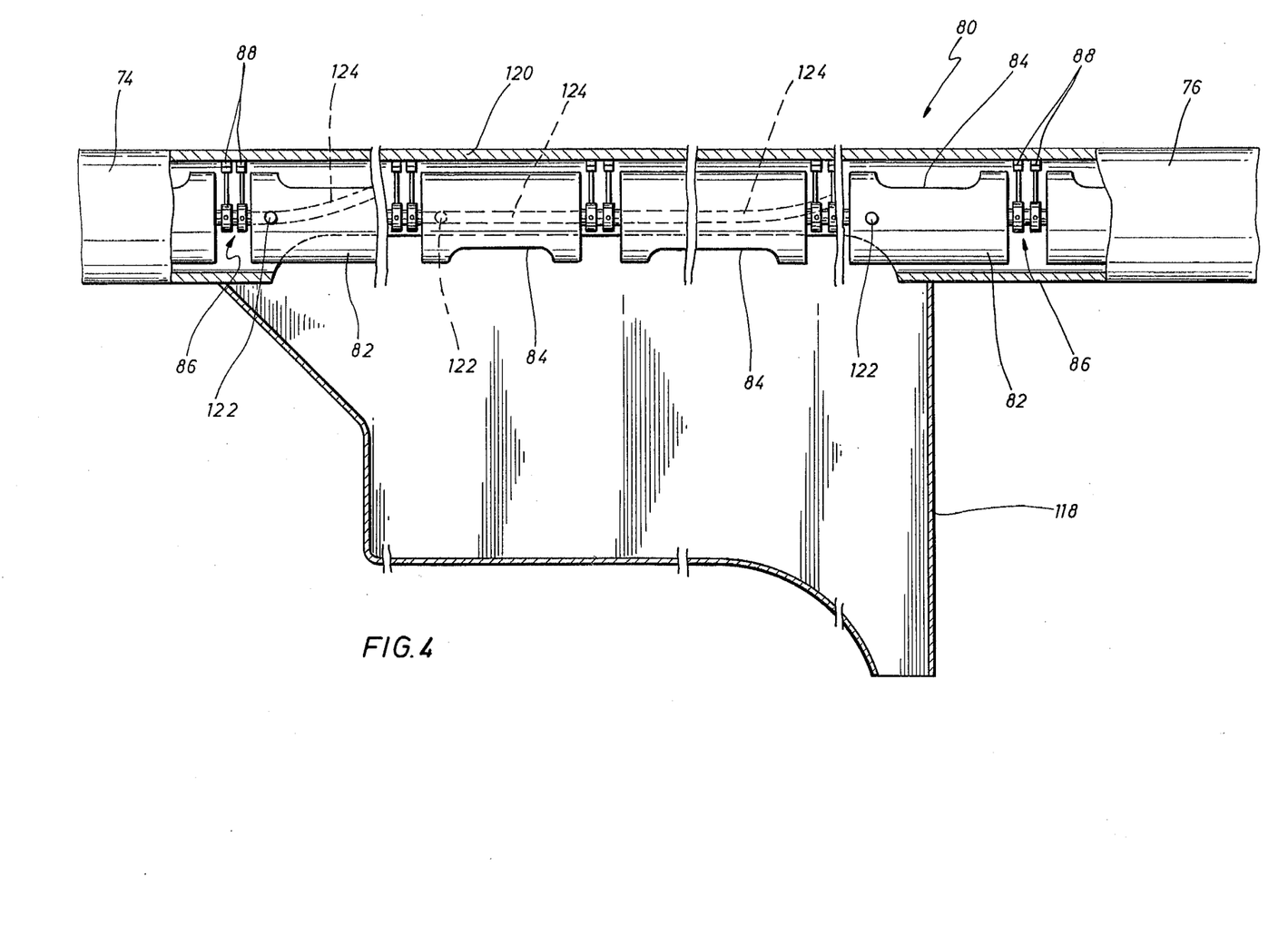
FIG. 4 is a schematic, fragmentary representation of the unloading station of the system of FIG. 3.

With reference to FIGS. 3-5 of the drawings, reference numeral 70 refers generally to an alternative embodiment of a pipeline capsule transportation system in accordance with the invention for transporting a continuous link of capsules 72.

The system 70 comprises a first elongated pipeline 74 and a second elongated pipeline 76 which constitute a continuous loop of pipeline having a loading station 78 at one location in the loop, and having an unloading station 80 at another location in the loop. The first pipeline 74 constitutes a forward pipeline between the loading station 78 and the unloading station 80, whereas the second pipeline 76 constitutes a return pipeline.

The pipeline loop contains the continuous link of capsules 72 which extends from the one end of the loading station 78 through the unloading station 80 to the other end of the loading station 78.

The continuous link 72 comprises capsules 82 which correspond generally with the capsules 18 of FIGS. 1 and 2, and which have openings 84.

The capsules 82 are maintained in the pipeline so that their openings 84 are normally directed upwardly.

The capsules 82 are coupled by means of couplers 86 which correspond with the couplers 22, and are supported conveniently by magnetic support means 88 corresponding to the magnetic support means 20 of the system of FIGS. 1 and 2.

The couplers 86 are such that the capsules 82 can be pivotally displaced relative to the couplers 86 about the elongated axes of the capsules 82.

The loading station 78 includes a plurality of separate handling zones 90 (only two being shown for convenience).

Capsules positioned in the handling zones 90 can be inspected, can be maintained, or can be loaded as will be hereinafter described.

Each handling zone 90 includes displacement means for displacing capsules from the handling zone 90 to the first pipeline 74.

While the displacement means may be in the form of mechanical or fluid pressure displacement means, the displacement means may conveniently be provided by each handling zone 90 having a downwardly inclined discharge conduit 92 leading to the first pipeline 74 to allow displacement of capsules under the influence of gravity.

The loading station 78 further includes acceleration means 93 for accelerating capsules displaced into the first pipeline 74 up to the speed of the link of capsules 72, and coupling means 94 for coupling such accelerated capsules to a trailing end of the continuous link 72 moving along the first pipeline 74.

The acceleration means 93 comprises an enclosure 96 which surrounds a length of the first pipeline 74 and is in fluid communication therewith, and pump means 98 for pumping fluid from a manifold 100 into a manifold 102 to cause a flow of fluid along the enclosure to accelerate capsules 82 passing through the length of pipeline within the enclosure.

The coupling means 94 is of conventional electromagnetic type for coupling accelerated capsules 82 to the trailing end of the link 72.

The loading station 78 further includes electromagnetic decoupling means 104 for decoupling capsules 82 from the leading end of the continuous link 72 in the second pipeline 76.

While single capsules 82 can be decoupled, in practice predetermined groups of capsules 82 would be decoupled with the decoupled groups of capsules constituting trains 106.

The loading station 78 further includes diverting means 108 associated with each handling zone 90 to divert decoupled trains 106 into the handling zones 90.

The diverting means 108 are selectively operable to divert trains 106 into selected handling zones 90 during use.

While the diverting means 108 may be of various conventional types, the diverting means 108 may conveniently be in the form of diverting means as illustrated particularly in FIG. 5.

Each diverting means 108 comprises a flexible section of pipeline 110, and an actuating device 112 for displacing the pipeline section 110 between an operative position as shown in solid lines in the right-hand side of FIG. 5 and in dotted lines in the left-hand side of FIG. 5, and an inoperative position as shown as dotted lines in the right-hand side of FIG. 5 and in solid lines in the left-hand side of FIG. 5.

When the pipeline section 110 is in its operative position, it will divert a train 106 into a handling zone 90 and, when in its inoperative position, the train or continuous link will continue past that particular handling zone 90.

Each handling zone 90 further includes brake means 114 for bringing a train 106 to rest in the handling zone.

In one example of the invention, the brake means 114 may be of any conventional type which can sense the last capsule 82 of a train 106 and exercise a braking effect on that last capsule thereby retaining the capsules 82 of the train 106 in tension until they are brought to a stop.

In an alternative example of the invention, the brake means may be provided by having an upwardly inclined portion of the pipeline leading to the handling zone 90, and merely having auxiliary brake means to bring the train 106 to rest in the appropriate position.

Each handling zone 90 further includes loading means 116 for loading the capsules of a train with required materials to be transported, while the train 106 is stationary in the handling zone 90.

It will be appreciated that the rates of coupling and decoupling of trains 106 will be kept constant to ensure that a continuous link 72 is maintained in the pipeline loop.

The unloading station 80 includes unloading means for dynamically unloading the capsules 82 while they are moving through the unloading station 80.

The unloading station 80 is illustrated more specifically in FIG. 4 of the drawings.

The unloading station 80 comprises a discharge hopper 118 for receiving material discharged from the capsules 82.

The unloading station 80 further includes an unloading pipeline section 120 which joins the first pipeline 74 to the second pipeline 76.

The pipeline section 120 is an inverted half-section pipeline to provide a large discharge zone for the discharge of materials under gravity from the capsules 82.

Each capsule 82 has a radially projecting inverting flange 122, whereas the pipeline section 120 has a helical-type inverting groove 124.

When a capsule 82 enters the pipeline section 120, its inverting flange 122 will engage in the inverting groove 124. As the capsule 82 moves along the section 120 the inverting flange 122 will cooperate with the inverting groove 124 to progressively pivot the capsule 82 until it has been entirely inverted. The contents of the capsule will be discharged under the action of gravity to the hopper 118. The capsule 82 will then continue in an inverted position for a certain distance along the pipeline section 120, whereafter the inverting groove 124 will cause the capsule 82 to return to its normal upright condition.

It will be appreciated that the capsules 82 will include means to maintain them in their normal upright condition during passage through the pipeline and in the handling zones 90.

It will further be appreciated that the magnetic support means 88 will continue to be effective through the pipeline section 120 and only the capsules 82 will be pivotally displaced relative to the magnetic support means 88.

The handling zones 90 may conveniently comprise upwardly directed half-section pipes to facilitate loading of trains 106, and to facilitate inspection and maintenance of such train in the handling zones 90.

In one of the further alternative embodiments of the invention disclosed in this specification, the loading and unloading stations will correspond substantially with each other.

In this alternative embodiment of the invention, as applied to the embodiment illustrated in FIG. 3, the loading station at one location in the pipeline loop will correspond to the loading station 78 and will include the acceleration means 93 as described with reference to the FIG. 3 embodiment. However, in place of the unloading station 80 as illustrated in FIG. 3, the unloading station at another location in the pipeline loop will be an unloading station which corresponds with the loading station 78 and which thus includes acceleration means corresponding to the acceleration means 93.

The capsules constituting the continuous link of capsules in the embodiments of the invention as illustrated in the drawings are all linked together and are transported through the pipeline so that the links are maintained in tension. While the capsules are preferably contiguous, it will be appreciate that, if desired, groups or sets of capsules may be spaced from other groups or sets of capsules in the link of capsules, provided such groups or sets are connected to other groups or sets by means of elongated links which are sufficiently flexible to allow the link of capsules to move through the pipeline despite curves in the pipeline.

It should be noted that since the capsules of the continuous link of capsules are transported such that the links are in tension, once a train is decoupled from the link, it will be relieved of the resistance of the remainder of the link and will therefore tend to accelerate automatically away from the link and into a desired handling zone.

It is an advantage of the embodiments of the invention as illustrated in the drawings that an effective method is provided for loading and unloading capsules, and, if necessary, for replacing capsules, inspecting capsules and maintaining capsules.

The embodiments of the invention as illustrated in the drawings can provide the further advantage that the pipeline capsule transportation system can be capable of loading and unloading capsules moving at rates in the order of 30 meters per second within the pipeline.

Furthermore, the embodiments can provide the advantage that the loading and unloading of capsules in capsule transportation systems can be effectively handled where the capsules with their charges of materials being conveyed, effectively constitute about 60% to 70% of the total pipeline volume.

What is claimed is:

1. A pipeline capsule transportation system comprising:
   a first pipeline;
   a substantially continuous first link of capsules in said first pipeline;
   a second pipeline;
   a substantially continuous second link of capsules in said second pipeline;
   a station for unloading said first link of capsules, and for loading said second link of capsules, said station comprising:
   decoupling means for decoupling from said first link at a decoupling location in said frist pipeline a predetermined number of capsules, said predetermined number of capsules defining a train;
   coupling means for coupling said train together with said second link at a coupling location in said second pipeline;
   conduit means for providing a path for said train between said decoupling means and said coupling means;
   valve means for isolating a zone in said conduit means from fluid communication with said first and said second pipelines; and
   brake means for stopping said train in said isolated zone.

2. The pipeline capsule transportation system of claim 1 and further comprising:
   pump means for increasing a pressure in said isolated zone, said valve means being cooperable with said pump means for creating a zone of relatively high pressure in said isolated zone to accelerate said train from said isolated zone toward said coupling means.

3. The pipeline capsule transportation system of claim 1 and further comprising:
   first access means for placing a storage container in fluid communication with an inside of at least one capsule comprising said train when said train is in said isolated zone, said first access means being operable to empty at least one capsule comprising said train.

4. The pipeline capsule transportation system of claim 3 and further comprising:
   second access means for placing a supply container in fluid communication with an inside of at least one capsule comprising said train when said train is in said isolated zone, said second access means being operable to fill at least one capsule comprising said train.

5. The pipeline capsule transportation system of claim 1 and further comprising:
   control means for controlling said decoupling means and said coupling means, to provide an uncoupling rate substantially equal to a coupling rate.

6. The pipeline capsule transportation system of claim 1 and further comprising magnetic support means for magnetically supporting said first link of capsules.

7. The pipeline capsule transportation system of claim 6 wherein said decoupling means comprises magnetic field producing means for producing a magnetic field which opposes a magnetic field of said magnetic support means.

8. The pipeline capsule transportation system of claim 1 wherein said station further comprises first acceleration means for accelerating said train after said train is decoupled from said first link.

9. The pipeline capsule transportation system of claim 2 and further comprising second acceleration means cooperable with said pump means for accelerating said train from said isolated zone toward said coupling means.

10. A method for loading and unloading a pipeline capsule transportation system comprising:
    conveying a first contiguous link of capsules in a first length of pipeline;
    selecting a predetermined number of capsules in the first length of pipeline, said predetermined number of capsules defining a train;
    uncoupling the train of capsules from the first contiguous link;
    accelerating the train of capsules along a first longitudinal pathway of pipeline;
    diverting the train of capsules into a transverse pathway of pipeline where the capsules may be loaded and unloaded;
    sealing a first and second end of the transverse pathway when the train of capsules are positioned therein;
    pressurizing the sealed transverse pathway;
    communicating the transverse pathway with a second longitudinal pathway;
    accelerating the train of capsules along the second longitudinal pathway; and
    coupling the train of capsules to a second contiguous link of capsules in a second length of pipeline.

11. A pipeline capsule transportation system for transporting a continuous link of capsules, the system comprising a first elongated pipeline along which a continuous link of capsules is to be transported, a loading station for loading capsules, and an unloading station for unloading capsules, the loading station comprising a handling zone, displacement means for displacing capsules from the handling zone to the first pipeline, and coupling means for coupling capsules entering the first pipeline to a trailing end of a continuous link of capsules moving along the first pipeline during use.

12. A system according to claim 11, in which the displacement means comprises a charging conduit for charging capsules into the first pipeline, and acceleration means within the handling zone for accelerating capsules into the first pipeline.

13. A system according to claim 12, in which the acceleration means comprises valve means to isolate the handling means from the first pipeline, and pump means to create fluid pressure to accelerate capsules into the first pipeline when the valve means is opened.

14. A system according to claim 11, in which the unloading station comprises an unloading zone, decoupling means for decoupling capsules from a continuous link of capsules moving in the first pipeline, diverting means for diverting decoupled capsules to the unloading zone, and brake means to bring capsules to rest in the unloading zone.

15. A system according to claim 14, in which the loading station comprises a plurality of separate handling zones, with each handling zone having displacement means, and in which the unloading station comprises a plurality of separate unloading zones, with each unloading zone having brake means, and with each unloading zone having diverting means associated therewith, the diverting means being selectively actuable to divert decoupled capsules into selected unloading zones.

16. A system according to claim 11, including a second elongated pipeline along which a continuous link of capsules is to be transported to the loading station, and in which the loading station includes decoupling means for decoupling capsules from a continuous link of capsules moving in the second pipeline, diverting means for diverting decoupled capsules to the handling zone, and brake means to bring capsules to rest in the handling zone.

17. A system according to claim 16, in which the first and second pipelines constitute a continuous loop of pipeline having the loading station at one location in the loop and having the unloading station at another location in the loop, and in which the unloading station includes unloading means for unloading capsules while they are moving through the unloading station.

18. A system according to claim 17, in which the unloading means includes inverting means for inverting capsules while passing through the unloading station, and storage means for storing capsule charges discharged under gravity from inverted capsules in the unloading station.

19. A system according to claim 16, in which the first and second pipelines constitute forward and return pipelines of the system with the loading station at one end and the unloading station at the other end, and in which the unloading station comprises an unloading zone, decoupling means for decoupling capsules from a continuous link of capsules moving in the first pipeline, diverting means for diverging decoupled capsules to the unloading zone, brake means to bring capsules to rest in the unloading zone, displacement means for displacing capsules from the loading zone to the second pipeline, and coupling means for coupling capsules entering the second pipeline to a trailing end of a continuous link of capsules moving in the second pipeline.

20. A system according to claim 19, in which the loading station comprises a plurality of separate handling zones, and in which the unloading station comprises a plurality of separate unloading zones, with each of the handling and unloading zones having brake means and displacement means, and with each of the handling and unloading zones having diverting means associated therewith, the diverting means being selectively actuable to divert decoupled capsules into selected zones.

21. A system according to claim 20, in which each displacement means comprises means for moving capsules from one of the zones to one of the pipelines, and acceleration means in the pipelines for accelerating such capsules in the pipelines prior to coupling with a continuous link of capsules moving in the pipeline.

22. A system according to claim 21, in which each acceleration means comprises an enclosure surrounding a length of pipeline and in fluid communication with the length of pipeline, and pump means for pumping a flow of fluid along the enclosure to accelerate capsules passing through the length of pipeline.

23. A method of loading and unloading a pipeline capsule transportation system which includes the steps of:
conveying a first continuous link of capsules in a first elongated pipeline;
selecting a predetermined number of capsules from a leading end of the first continuous link of capsules, said predetermined number of capsules defining a train;
uncoupling the train of capsules from the link;
diverting the train into a handling zone of a loading station and bringing the train to rest in the handling zone;
loading the capsules in the handling zone;
displacing the train of loaded capsules from the handling zone to a second elongated pipeline wherein a second continuous link of capsules is being conveyed;
coupling the train to a trailing end of the moving second link of capsules; and
unloading the capsules at an unloading station between the first and second pipelines, the unloading station being at a point remote from the loading station.

24. A method according to claim 23, in which the first and second pipelines constitute return and forward pipelines of the system, and in which the capsules are unloaded at the loading station by selecting a predetermined number of capsules from a leading end of the second link of capsules to define a train, uncoupling the train, diverting the train into an unloading zone of the unloading station, bringing the train to rest in the unloading zone, unloading the train, displacing the train into the first pipeline, and coupling the train to a trailing end of the first continuous link of capsules moving in the first pipeline.

25. A method according to claim 23, in which the first and second pipelines constitute a continuous loop, in which the first and second links of capsules constitute a single continuous link of capsules, and in which the capsules are unloaded at the unloading station while the capsules are moving through the unloading station.

* * * * *

UNITED STATES PATENT AND TRADEMARK OFFICE
CERTIFICATE OF CORRECTION

PATENT NO. : 4,234,271
DATED : November 18, 1980
INVENTOR(S) : Alexander I. Kalina It is certified that error appears in the above-identified patent and that said Letters Patent are hereby corrected as shown below:

On the title page, under Related Application Data delete "1979" and insert -- 1978 --.

In Column 1, line 9, delete "1979" and insert --1978--.

In Column 6, line 19, delete "925,513" and insert --925,514--, line 36, delete "now abandoned."

Signed and Sealed this

Fourth Day of August 1981

[SEAL]

Attest:

GERALD J. MOSSINGHOFF

Attesting Officer

Commissioner of Patents and Trademarks